(12) United States Patent
Tanimura

(10) Patent No.: US 6,463,216 B2
(45) Date of Patent: Oct. 8, 2002

(54) FILM UNIT WITH A LENS

(75) Inventor: Shingo Tanimura, Takatsuki (JP)

(73) Assignee: D.O.G., Inc., Chuo-ku (JP)

( * ) Notice: Subject to any disclaimer, the term of this patent is extended or adjusted under 35 U.S.C. 154(b) by 0 days.

(21) Appl. No.: 09/859,409

(22) Filed: May 18, 2001

(65) Prior Publication Data

US 2001/0051043 A1 Dec. 13, 2001

(30) Foreign Application Priority Data

May 19, 2000 (JP) .......................................... 2000-148782

(51) Int. Cl.[7] ................................................. G03B 1/66
(52) U.S. Cl. ............................................ 396/284; 396/6
(58) Field of Search .............................. 396/284, 6, 292

(56) References Cited

U.S. PATENT DOCUMENTS

| | | | | | |
|---|---|---|---|---|---|
| 4,272,168 | A | * | 6/1981 | Maitani et al. | 396/169 |
| 5,758,216 | A | * | 5/1998 | Arnold | 396/311 |
| 5,826,112 | A | * | 10/1998 | Matsushita | 396/6 |
| 5,832,322 | A | * | 11/1998 | Zawodny et al. | 396/284 |

* cited by examiner

Primary Examiner—David M. Gray
Assistant Examiner—Michelle Nguyen
(74) Attorney, Agent, or Firm—Mattingly, Stanger & Malur, P.C.

(57) ABSTRACT

A film unit includes a body with an optical system having a lens therein. An advance system for advancing a film includes a film counter displaying information relating to the number of pictures remaining in the film and further displays additional information unrelated picture taking.

4 Claims, 4 Drawing Sheets

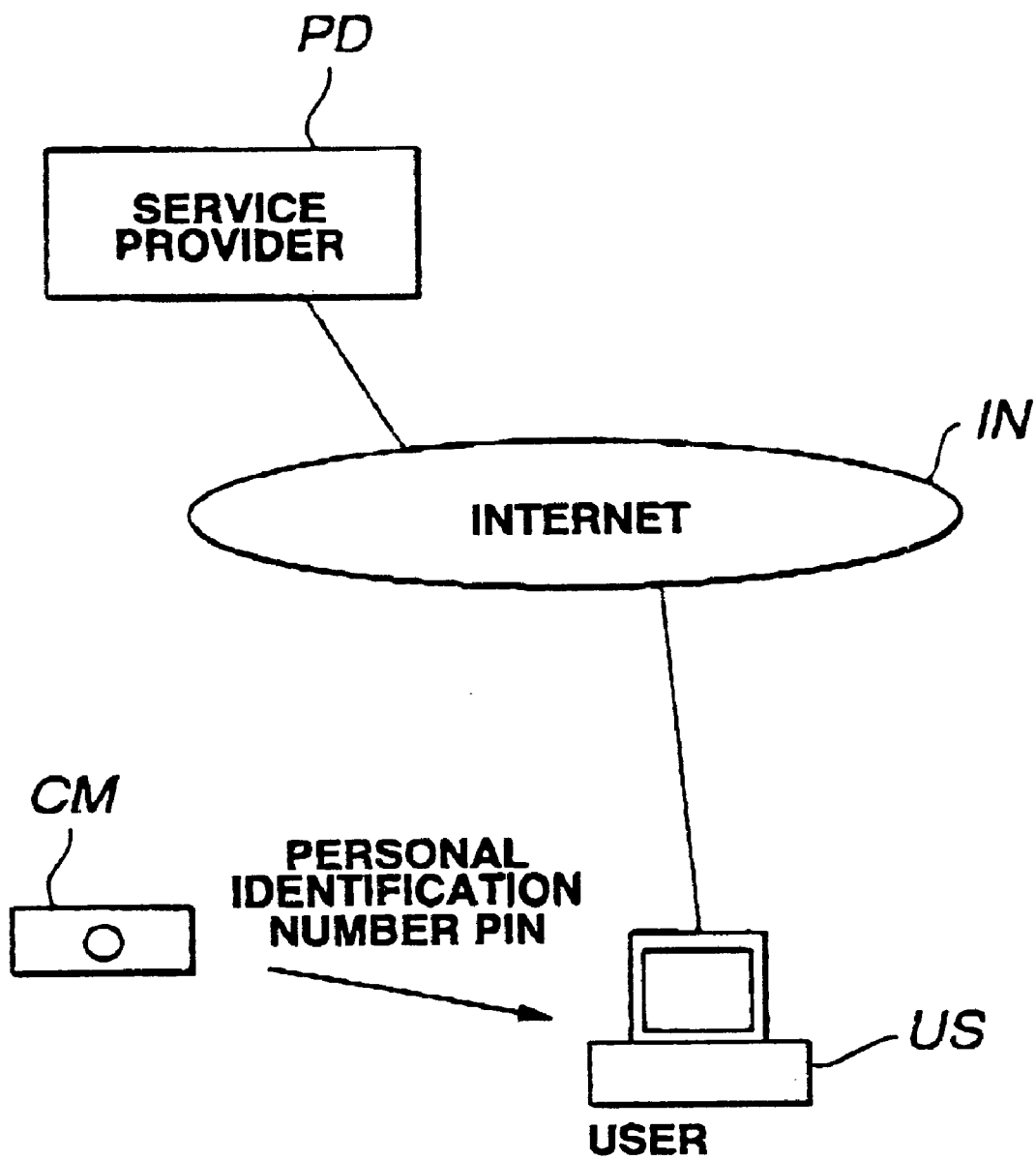

FILM UNIT WITH A LENS

FIELD OF THE INVENTION

The present invention relates to a film unit with a lens.

DESCRIPTION OF RELATED ART

A film unit with a lens is widely used as a disposable camera. There are no goods or services that have added any purposes to the film unit with a lens other than the purpose of taking a photo.

SUMMARY OF THE INVENTION

An objective of this invention is to provide game characteristics with a film unit with a lens to give it an additional value as a tool for providing various services.

A film unit with a lens in connection with this invention displays an additional notation to a film counter, which gives the film unit with a lens game characteristics. Thereby, various services are capable of being provided in accordance with the additional notation.

In this invention, the additional notation indicates a service to a user of the film unit with a lens, and it may be a personal identification number for the user receiving a prescribed service.

Moreover, a method for providing a service in connection with this invention displays an additional notation to a film counter of a film unit with a lens, and provides a prescribed service to a user in accordance with the additional notation. Thereby, a film unit with a lens that has been widely used can be employed as a tool for providing various services.

BRIEF DESCRIPTION OF DRAWINGS

FIG. 5 is a block diagram showing a service mode by the embodiment.

EMBODIMENTS

Next, described is one embodiment of a film unit with a lens in connection with this invention according to the drawings.

Figure 1:
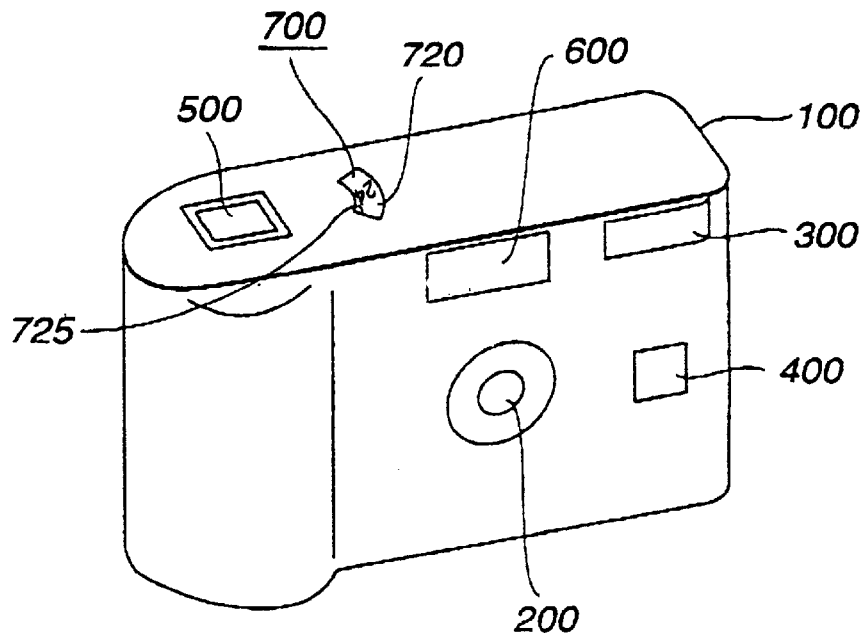
FIG. 1 is a perspective view showing the face of an embodiment of a film unit with a lens in connection with this invention.
Figure 2:
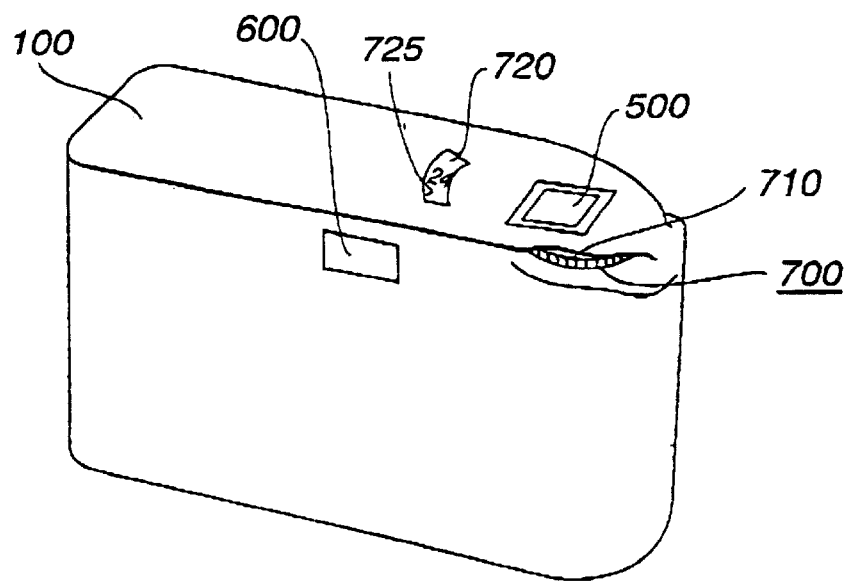
FIG. 2 is a perspective view showing the back of the embodiment.
Figure 3:
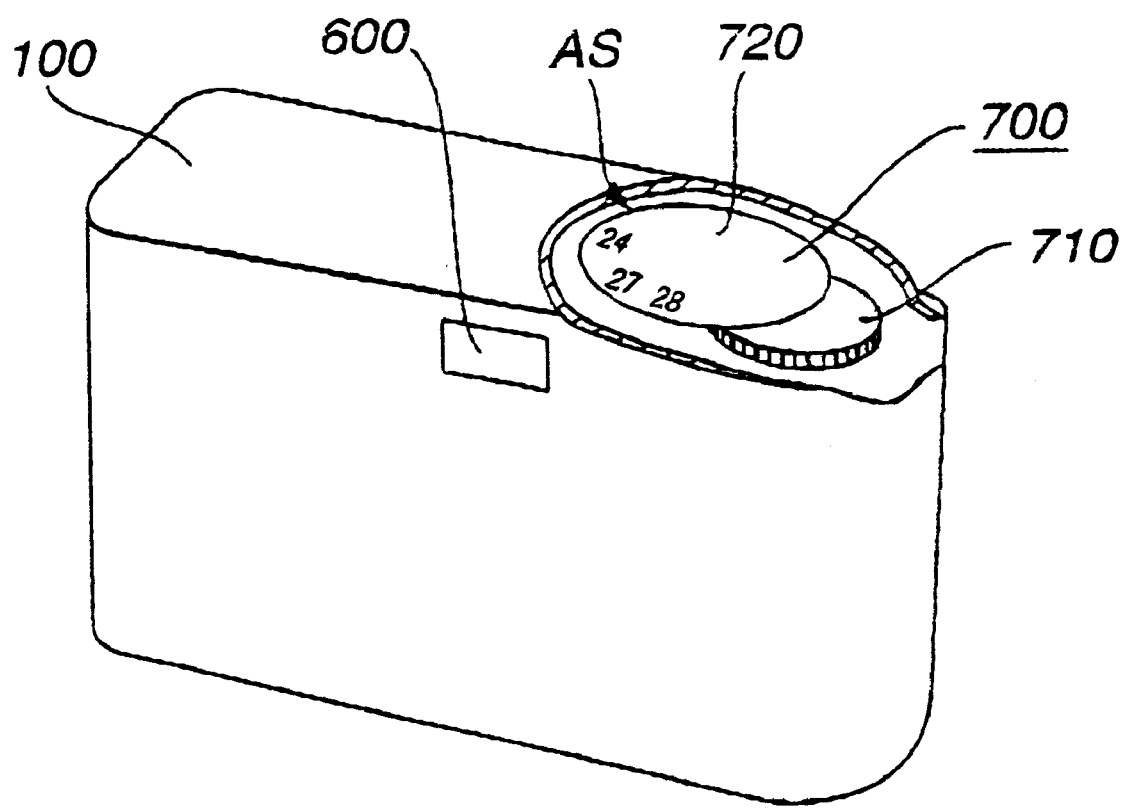
FIG. 3 is a partly breaking perspective view of the embodiment.
Figure 4:
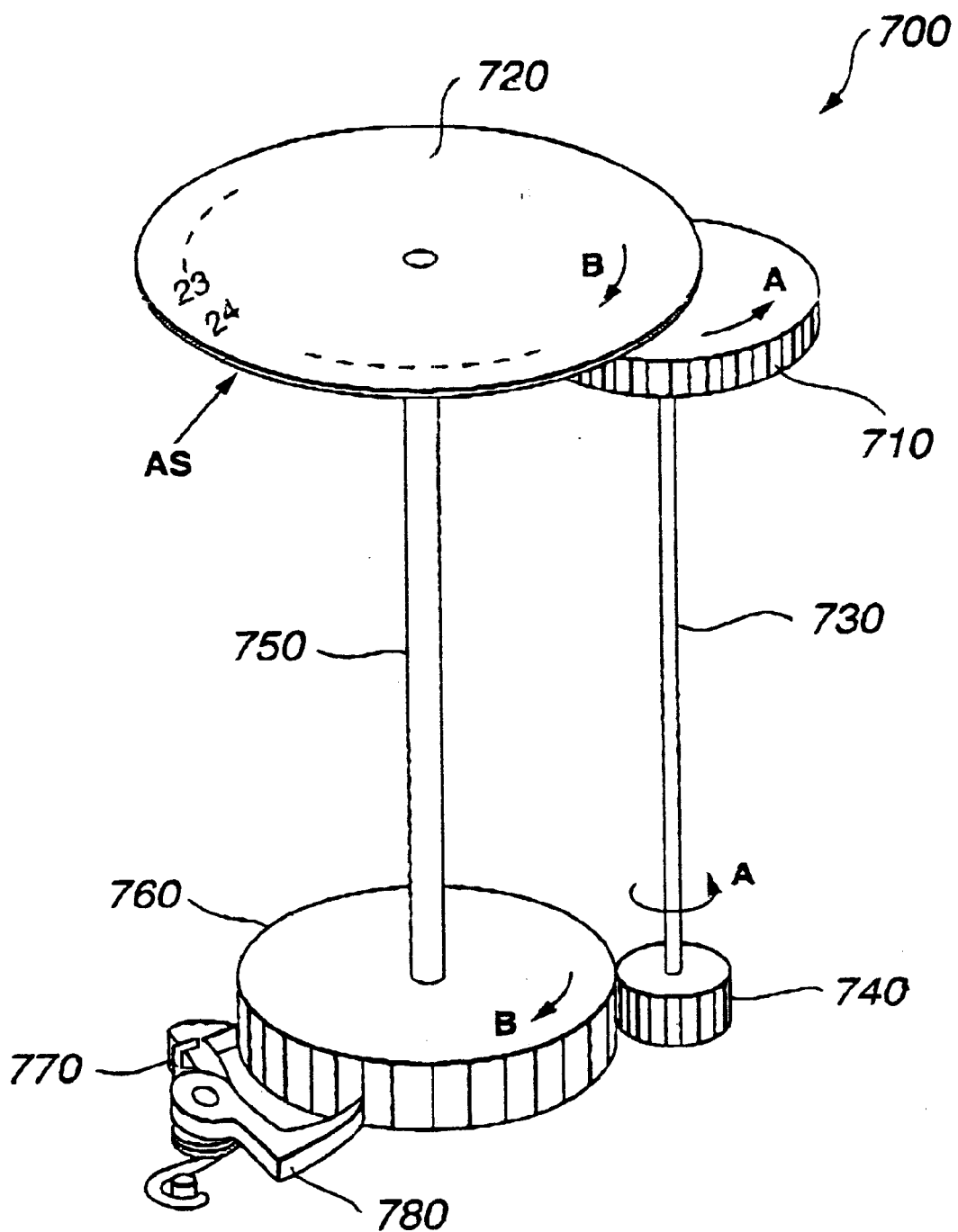
FIG. 4 is a perspective view showing the advance system of the embodiment.

FIG. 1 is a perspective view showing the face of a film unit with a lens. FIG. 2 is a perspective view showing the back of a film unit with a lens. FIG. 3 is a partly breaking perspective view showing the back of the same embodiment. FIG. 4 is a perspective view showing an advance system.

A film unit with a lens comprises an optical system 200, a flash lamp 300 and a flash lamp switch 400 on the face of a body 100, a release switch 500 on the top face of the body 100, a finder 600 which opens to the back and the face on the upper part of the body 100. In the film unit with a lens, a film with a film cassette (omitted in the drawing) is stored in advance, which is rolled up by an advance system 700.

As is well known, the body 100 holds the light density of the film, the optical system 200 focuses an image of an object onto the film, the flash lamp 300 emits the light to illuminate the object upon taking the photo, the flash lamp switch 400 starts the charge in order to emit the light of the flash lamp 300, and the release switch 500 starts the film exposure by the optical system.

The advance system 700 comprises a sprocket 710 which is rotatable by a user's finger, and a film counter 720 which rotates with a rotation of the sprocket. The film counter 720 is a disc which displays the number of remaining pictures on the top face of the body, and when the sprocket 710 is made to be rotated rightward (the direction of arrow A in FIG. 4), the film counter 720 rotates leftward (the direction of arrow B in FIG. 4). Any one of the numbers of the film counter 720 is displayed in a counter window 725 on the top face of the body 100. Moreover, the number of taken pictures can also be displayed in the film counter 720. In this embodiment, in order to display the number of remaining pictures, the number that sequentially decreases to the direction opposite to the direction B is displayed.

The sprocket 710 is connected with a gear 740 through a central axis 730, and the gear 740 is engaged with a gear 760 through the film counter 720 and a central axis 750. The film is rolled up by the rotation of the central axis 730. The gear 740 is narrower than the gear 760, and when the central axis 730 rolls up one frame of the film, the film counter 720 rotates to decrease by one the number of remaining pictures which are displayed in the film counter 720.

The gear 760 is engaged with a ratchet 780 energized by a spring 770, and at every instance of the rolling up of one frame of the film, the advance system 700 goes off.

In the film counter 720, shown in FIG. 3 and FIG. 4, an additional notation "value" (described in number AS) irrelevant to the number of pictures is displayed, and which is displayed in a counter window 725 at the time when the remaining number becomes zero. The additional notation AS is randomly set up in the film unit with a lens, and in accordance with the additional notation, the producers or providers of the film unit with a lens may provide a user with various services. That is, the film unit with a lens can be employed as a tool for providing various services.

Moreover, it is possible to make the additional notation a personal identification number, in accordance with which services will be provided. For example, as shown in FIG. 5, when a user US who obtained a personal identification number PIN, such as a secret number, accesses a service provider PD through the internet IN, the services corresponding to the personal identification number may be provided. In FIG. 5, the film unit is designated as CM.

Moreover, it is possible to make the additional notation a personal identification number, in accordance with which the services will be provided. For example, as shown in FIG. 5, when a user US who obtained a personal identification number PIN, such as a secret number, accesses a service provider PD through the internet IN, the services corresponding to the personal identification number may be provided.

As mentioned above, the film unit with a lens which is greatly used can be employed as a tool for providing various services, and enables itself to be promoted, as well as is capable of being used as a new marketing tool, an advertising medium and digital money.

Effects of the Invention

The present invention may provide a film unit with a lens with game characteristics and an additional value as a tool for providing various services.

What is claimed is:

1. A film unit comprising:

a body;

an optical system having a lens in said body; and an advance system having means for advancing a film, said advance system including a film counter displaying information relating to the number of pictures remaining on said film and further displaying additional information unrelated to picture taking.

2. A film unit as defined in claim 1 wherein said additional information indicates a service to a user of said film unit.

3. A film unit as defined in claim 1 wherein said additional information is a personal identification number for a user receiving a prescribed service.

4. A method for displaying additional information on a film counter of an advance system of a film unit having a display window and an optical system with a lens, comprising the steps of:

providing said film counter with information unrelated to picture taking; and advancing said film counter to display said additional information through said display window.

* * * * *